United States Patent
Kim et al.

(10) Patent No.: US 7,596,120 B2
(45) Date of Patent: Sep. 29, 2009

(54) MULTIPLE MODE TERMINAL SUPPORTING HANDOFF BETWEEN HETEROGENEOUS NETWORKS AND HANDOFF METHOD THEREOF

(75) Inventors: Jae-Pyeong Kim, Daejeon (KR); Do-Hyung Kim, Daejeon (KR); Sun-Ja Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 372 days.

(21) Appl. No.: 11/286,984

(22) Filed: Nov. 22, 2005

(65) Prior Publication Data
US 2006/0120329 A1 Jun. 8, 2006

(30) Foreign Application Priority Data
Dec. 7, 2004 (KR) .................. 10-2004-0102573
Aug. 8, 2005 (KR) .................. 10-2005-0072371

(51) Int. Cl.
*H04Q 7/00* (2006.01)
(52) U.S. Cl. .................. 370/331; 370/329; 370/330
(58) Field of Classification Search .............. 455/435.2, 455/437, 439, 442, 445, 452.1, 452.2, 453
See application file for complete search history.

(56) References Cited

U.S. PATENT DOCUMENTS

2004/0203788 A1* 10/2004 Fors et al. .................. 455/439
2005/0009530 A1* 1/2005 Rouffet et al. ............ 455/452.1
2005/0128981 A1* 6/2005 Creamer et al. ............. 370/332
2006/0193272 A1* 8/2006 Chou et al. .................. 370/310

FOREIGN PATENT DOCUMENTS

KR 10-2005-0077122 8/2005

* cited by examiner

*Primary Examiner*—Patrick N. Edouard
*Assistant Examiner*—Dai A Phuong
(74) *Attorney, Agent, or Firm*—Blakely, Sokoloff, Taylor & Zafman LLP

(57) ABSTRACT

A multiple mode terminal according to an exemplary embodiment of the present invention includes a mode controller, an application service unit, a common link module, and a plurality of device drivers. The mode controller uses network state monitoring information and controls the handoff between a plurality of networks. The application service unit includes protocols providing appropriate data communication services for the plurality of networks, and a plurality of programs designed to perform data communication services. The common link module performs the handoff between the heterogeneous networks by a handoff request of the mode controller, updates a transmission path of the data packet according to the performed handoff, and supports a data communication service of the application service unit. The plurality of device drivers control the terminal to function for the data service in the plurality of networks.

12 Claims, 6 Drawing Sheets

MULTIPLE MODE TERMINAL SUPPORTING HANDOFF BETWEEN HETEROGENEOUS NETWORKS AND HANDOFF METHOD THEREOF

CROSS-REFERENCE TO RELATED APPLICATION

This application claims priority to and the benefit of Korean Patent Application No. 10-2004-0102573 and 10-2005-0072371 respectively filed in the Korean Intellectual Property Office on Dec. 7, 2004, and Aug. 8, 2005, the entire contents of which are incorporated herein by reference.

BACKGROUND OF THE INVENTION (a) Field of the Invention

The present invention relates to a multiple mode terminal supporting handoff between heterogeneous networks, and a handoff method thereof. More specifically, the present invention relates to a multiple mode terminal and a handoff method for interworking between various heterogeneous networks so as to provide a seamless data communication service without being affected by changes of wireless access environment in various communication networks, based on mobile Internet protocol (IP).

(b) Description of the Related Art

Recently, bidirectional wireless communication using portable communication terminals such as a notebook and a personal digital assistant (PDA) has been widely used as users' requests for the mobile Internet have increased.

Accordingly, a data communication method using a mobile communication network of a code division multiple access (CDMA) method based on a third generation network has been developed as a new wireless network. However, there is a limit to using data communication through the mobile communication network since the data rate thereof is lower than a high speed wired Internet network, and the cost thereof is high.

In addition, a conventional wireless local area network (WLAN) method in IEEE 802.11 may be applied to various areas including an area required for terminal mobility, an area in which it is difficult to arrange cables, and a network connection between a building and another building. The WLAN method is limited in that wireless data communication is performed around a fixed access point AP within a short distance, rather than providing mobility of a mobile subscriber station. Accordingly, a wireless broadband (WiBro) Internet system has been developed by combining the merits of high speed and high quality data communication services of the WLAN and a wide service range of the mobile communication network.

By using the 2.3 GHz frequency band, the WiBro Internet system in IEEE 802.16 guarantees mobility at 60 km/h within 1 km, and speeds of 3 Mbps download and 1 Mbps upload for each user.

The service area of the WiBro Internet system is narrow even though it has the merits of mobility and high speed data communication, and a high speed service is not provided for a mobile communication system based on CDMA due to the limited wireless capacity thereof. Therefore, when services and terminals for performing interworking between respective networks are developed, a seamless data communication service may be provided within a broad area since it provides users with the merits of a mobile communication network and a WiBro Internet network.

However, a high speed seamless data communication service may not be provided for users at a low cost since mobile communication terminals and WiBro Internet terminals have been independently developed in respective models. Therefore, when a mobile communication service user enters a WiBro Internet network service area, the service is required to be switched to the high speed WiBro Internet service, and when the user leaves the WiBro Internet network service area, the service is required to be switched back to the mobile communication service. In addition, it is required to develop a multiple mode terminal for concurrently supporting the data communication of the mobile communication network and the WiBro Internet network.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a multiple mode terminal and a handoff method for interworking between various heterogeneous networks so as to provide a seamless data communication service without being affected by changes of wireless access environment in various communication networks based on mobile Internet protocol (IP).

An exemplary multiple mode terminal according to an embodiment of the present invention includes a mode controller, an application service unit, a common link module, and a plurality of device drivers. The mode controller uses network state monitoring information and controls the handoff between a plurality of networks. The application service unit includes protocols providing appropriate data communication services for the plurality of networks, and a plurality of programs designed to perform data communication services. The common link module performs the handoff between the heterogeneous networks by a handoff request of the mode controller, updates a transmission path of the data packet according to the performed handoff, and supports a data communication service of the application service unit. The plurality of device drivers controls the terminal to function for the data service in the plurality of networks.

In addition, the mode controller may include a control module and a plurality of network access modules. The control module selects a network providing an optimum communication service to the terminal among a plurality of accessible networks based on the network state monitoring information, and transmits the handoff request to the common link module. The plurality of network access modules control operations of the plurality of device drivers and perform authentication of the terminal in order to perform the handoff to a network selected by the control module.

In an exemplary handoff method of a multiple mode terminal having a platform supporting handoff between a plurality of networks so that the multiple mode terminal may provide seamless data communication according to a further embodiment, the multiple mode terminal determines whether an automatic network access is established, selects an optimum network based on received signal strength information when the automatic network access is established, establishes a transmission path of a data packet for the selected network, allocates a mobile Internet protocol (IP), changes a protocol parameter according to a corresponding network, and performs data transmission.

An exemplary computer readable recording medium according to an embodiment of the present invention includes a program to realize the above handoff method.

DETAILED DESCRIPTION OF THE EMBODIMENTS

Figure 1:
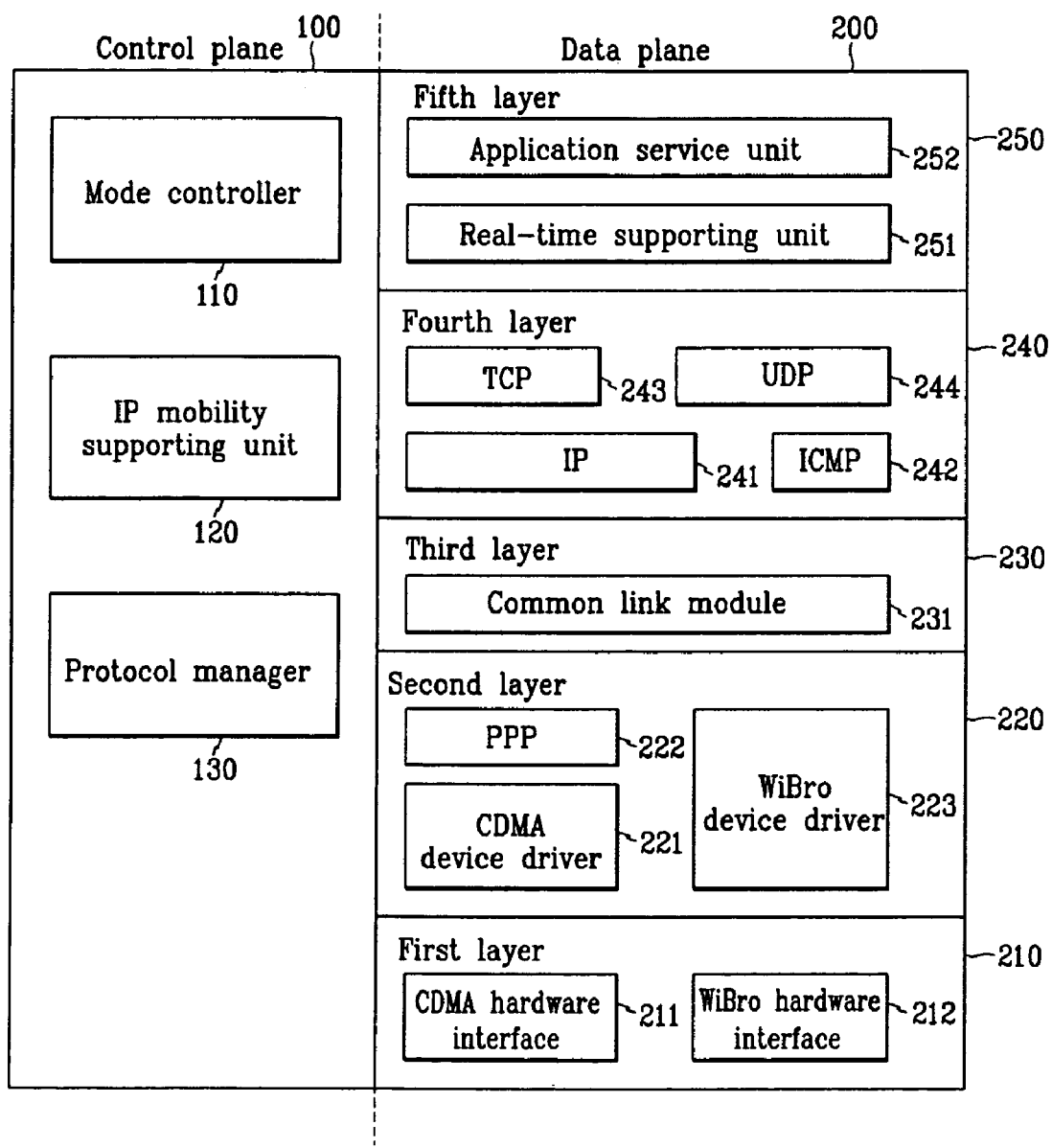
FIG. 1 shows a diagram for representing a platform mounted on a multiple mode terminal according to an exemplary embodiment of the present invention.

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. Throughout this specification and the claims which follow, unless explicitly described to the contrary, the word "comprise" or variations such as "comprises" or "comprising" will be understood to imply the inclusion of stated elements but not the exclusion of any other elements.

In addition, a module described in the specification indicates a block formed for variation and plug-in of a hardware or software system. That is, the module indicates a unit or a block for performing a predetermined function in the hardware and software.

A platform supporting handoff between heterogeneous networks and mounted on a multiple mode terminal according to an exemplary embodiment of the present invention may be realized as software, hardware, or a module.

FIG. 1 shows a diagram for representing a platform mounted on a multiple mode terminal according to an exemplary embodiment of the present invention. As shown in FIG. 1, a multiple mode terminal platform according to an exemplary embodiment of the present invention includes a control plane 100 and a data plane 200. A platform for interworking between a code division multiple access (CDMA) network and a wireless broadband (WiBro) Internet shown in FIG. 1 will now be described.

The control plane 100 includes a mode controller 110, an Internet protocol (IP) mobility supporting unit 120, and a protocol manager 130, and it controls data transmission performed by the data plane 200, and supports a handoff operation between heterogeneous networks (i.e., supports not only vertical handover, but also horizontal handover performed in the same network).

The mode controller 110 controls a terminal including a platform so that the terminal may automatically or manually switch a network based on communication state monitoring results, including a received signal strength, a data rate, and a transmission error rate of a current service network. A configuration and a function of the mode controller 110 will be described later in detail in the specification.

The IP mobility supporting unit 120 provides mobile IP so that the IP address may not be changed when the terminal accesses another network according to a handoff request of the mode controller 110, and a parameter may not be changed according to IP address change in a data transmission process in the data plane 200. To support the IP mobility at handoff, the terminal receives an IP address from the previous network, performs communication, receives a care of address (COA) from a foreign agent (FA) of a switched network, requests a home agent (HA) of the previous network to bind an address of the FA, encapsulates the FA address on an IP packet routed by the HA, and transmits the IP packet to the FA, and the FA receives the IP packet, eliminates an FA address encapsulated header from the IP packet, and transmits the IP packet to an higher application layer.

Since the IP mobility supporting unit 120 supports the mobile IP, the communication using the IP address used by the previous network may be performed even though the network is switched to another network when data transmission is performed in the data plane 200 of the terminal. Accordingly, an IP-based network connection of the higher application layer is maintained. The mobility of the terminal is guaranteed between the IP-based heterogeneous networks since it is not necessary to update the IP address at handoff and it is not necessary to perform an additional operation for the changing of IP address.

The protocol manager 130 varies protocol layer characteristics of the data plane 200 in real time based on predetermined protocol parameter information, and optimizes communication performance so that an optimized data communication service may be provided according to a communication state variation of the current network and a communication state variation due to the network switch between the heterogeneous networks. That is, the protocol manager 130 stores parameters of a data rate, a quality of service (QoS) management rule, and a protocol for a plurality of networks, and updates automatically the protocol parameters in the data plane 200 in real time according to characteristics of a switched network when the network is switched between the networks.

For example, when the network is switched to a heterogeneous network, the protocol manager 130 updates parameters including maximum segment size (MSS), congestion window size, received window size, time-out for retransmission, and round-trip time (RTT) according to characteristics of the data communication supported by the respective networks for transmission control protocol (TCP), establishes parameters to maintain the QoS required by the respective networks for the IP, and controls queue size and bandwidth for a device driver.

The data plane 200 for supporting data communication in an IP-based multi-network includes a first layer 210 including hardware interfaces, a second layer 220 including device drivers for controlling the terminal to function for the respective networks, a third layer 230 for performing the network switch between the respective networks, a fourth layer 240 having communication protocols including the TCP/IP, and a fifth layer 250 including an application program designed to perform a predetermined operation. The data plane 200 receives a handoff request transmitted by the control plane 100, accesses the respective hardware interfaces through the third layer 230, and may update a transmission path without variation of the fourth and fifth layers 240 and 250 even though the network is switched between the heterogeneous networks.

The first layer 210 including a CDMA hardware interface 211 and a WiBro hardware interface 212 matches a hardware chip (not shown) for controlling the terminal to function as a CDMA terminal and another hardware chip (not shown) for controlling the terminal to function as a WiBro terminal to the platform according to the exemplary embodiment of the present invention, and it operates and maintains physical links between systems and defines various functions. The hardware chip matched to the first layer 210 of the platform may be a type of chip for integrating the functions of the heterogeneous network, or a type of card including respective hardware chips.

The second layer 220 guarantees independent operations from the first layer in various communication methods, and includes a CDMA device driver 221 and a WiBro device driver 223 in the exemplary embodiment of the present invention. The CDMA device driver 221 and the WiBro device driver 223 are modules for connecting the hardware to the operating system application program, and they control hardware elements so that the hardware elements may perform an appropriate operation according to a desired purpose in an operating system. That is, the second layer 220 enables the terminal mounted on the platform according to the exemplary embodiment of the present invention to function as a terminal appropriate for the characteristics of the respective networks when switching between the respective networks.

In addition, since the CDMA device driver 221 and WiBro device driver 223 periodically determine the received signal strength state of a corresponding network, and provide the received signal strength state to the mode controller 110, the CDMA device driver 221 and WiBro device driver 223 may switch to another network when the received signal strength reaches a predetermined permissible low value. Also, the CDMA device driver 221 and the WiBro device driver 223 periodically collect communication state information including a data rate and a data error rate in the respective networks.

In addition, the second layer 220 may further include a point-to-point protocol (PPP) 222 supporting a data packet header compression, a password authentication protocol (PAP), or a challenge-handshake authentication protocol (CHAP). The PPP 222 encapsulates a PPP header on the IP packet transmitted from the higher or lower layer and transmits the IP packet to a PPP server in a CDMA network, and therefore, communication through the Internet may be performed by using more than one IP address at an area.

The third layer 230 including a common link module 231 switches a network link when the terminal access the respective networks, and controls connection for establishing a path for data communication regardless of hardware and application programs so as to guarantee transparency of the higher layer. The third layer 230 switches a link to the respective device drivers in the second layer 220 according to a link switch request transmitted from the control plane 100.

The common link module 231 in the third layer 230 performs the above functions of the third layer 230, receives a data packet from the fourth layer 240, and transmits the data packet to the device driver of the current access network. Due to the common link module 231, the data communication service may be continuously provided for the user without additionally inputting an indicator to the data packet in the fourth layer 240 and the fifth layer 250. At this time, the indicator indicates a network to be selected among the CDMA and WiBro networks for transmitting the data through the selected network.

When the common link module 231 receives a handoff request from the mode controller 110 while maintaining the current link based on the current access network information transmitted by the mode controller 110, the common link module 231 switches a data path so that the data may be transmitted through a device driver of a switched network. The common link module 231 maintains both accesses to the drivers 221 and 223 to minimize service interruption before the network switch is completed between the heterogeneous networks.

The common link module 231 includes a virtual device driver to control to transmit the data packet between the higher and lower layers through the common link module 231.

A media access control (MAC) address of a source and a target is required in order to perform a data process in the fourth layer 240 when the data packet is externally transmitted, and therefore the common link module 231 copies an MAC address of a current selected device driver and provides the MAC address to the fourth layer 240 as an MAC address of a virtual device driver. Accordingly, the fourth layer 240 may process the data packet by using the MAC address transmitted by the common link module 231 without specifying information on a data communication method. When receiving the data packet from the fourth layer 240, the common link module 231 determines which device driver is currently connected, and outputs the packet to a queue of a corresponding driver.

On the contrary, when an external packet is inputted to one of the device drivers in the second layer 220 through a hardware interface of the first layer 210, the common link module 231 establishes the device driver receiving the external packet as the common link module 231, and transmits the data packet to the higher layer.

Figure 2:
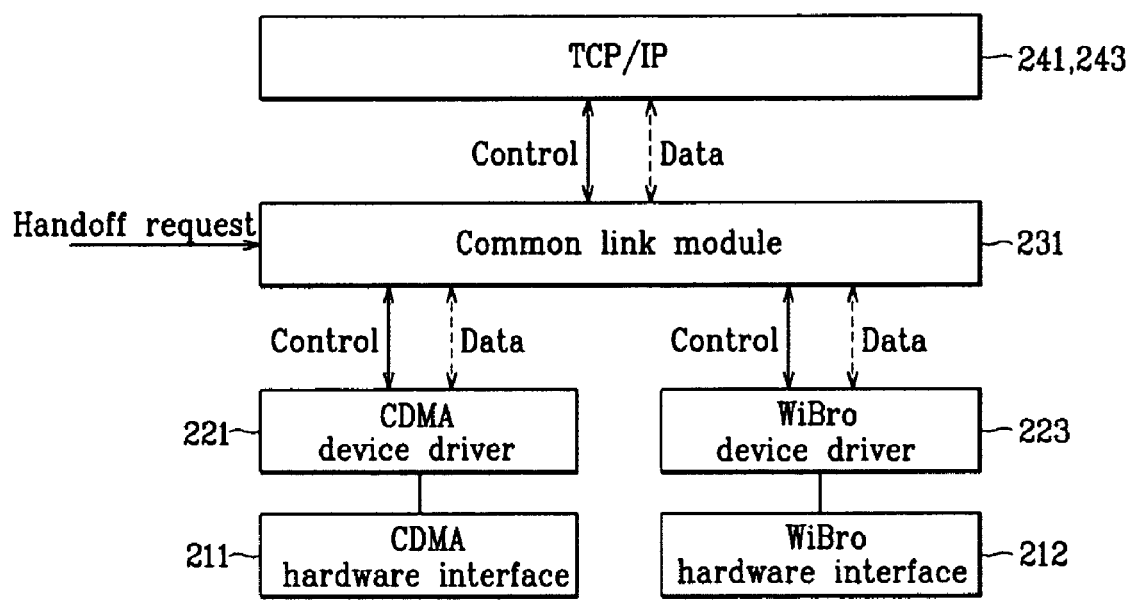
FIG. 2 shows a diagram for representing a data transmission path through a common link module of the multiple mode terminal according to the exemplary embodiment of the present invention.

FIG. 2 shows a diagram for representing a data transmission path through a common link module 231 according to the exemplary embodiment of the present invention. As shown in FIG. 2, the data packet is transmitted through an application service unit 252, TCP/IP units 241 and 243, the common link module 231, the CDMA device driver 221, and the CDMA hardware interface 211 when the multiple mode terminal according to the exemplary embodiment of the present invention is accessed to the CDMA network, and the data packet is transmitted through the application service unit 252, TCP/IP units 241 and 243, the common link module 231, the WiBro device driver 223, and the WiBro hardware interface 212 when the terminal is accessed to the WiBro networks. That is, when receiving the handoff request from a control module 111 shown in FIG. 3, the common link module 231 transmits the data packet having been transmitted to the CDMA device driver 221 to the WiBro device driver 223 or changes the transmission path of the data packet in a reverse direction.

The common link module 231 may also store information on data usage statistics of the respective drivers of the second layer 220 so as to support the network switch of the control plane 100.

While the common link module 231 performs a function of a virtual device driver and substitutes for actual device drivers of the respective networks in the exemplary embodiment of the present invention, the common link module 231 may perform the IP-based data communication without changing the configuration of the higher layer by modifying a header of the data packet transmitted to the common link module 231.

The fourth layer 240 includes Internet protocol (IP) 241, Internet control message protocol (ICMP) 242, TCP 243, and user datagram protocol (UDP) 244, so as to perform reliable data communication. That is, the fourth layer 240 performs similar functions with a network layer and a transport layer of an open systems interconnection (OSI) 7 layer.

The fifth layer 250 having programs designed to perform a predetermined service includes the application service unit 252 forming the program as a module, and a real-time supporting unit 251. The application service unit 252 may include various application programs including a Moving Picture Experts Group Audio Layer-3 (MP3) codec, H.263 codec, a web browser, a media player, and multimedia communication programs.

While the protocols 241 to 244 in the fourth layer 240 and the real-time supporting unit 251 and the application service unit 252 in the fifth layer 250 are separately operated in the exemplary embodiment of the present invention, they may be included in the applied service unit 252 rather than being separated into the respective blocks. In addition, while the platform for interworking between the CDMA and WiBro networks has been described in the exemplary embodiment of the present invention, the platform may support interworking between heterogeneous networks providing IP-based data communication services.

Figure 3:
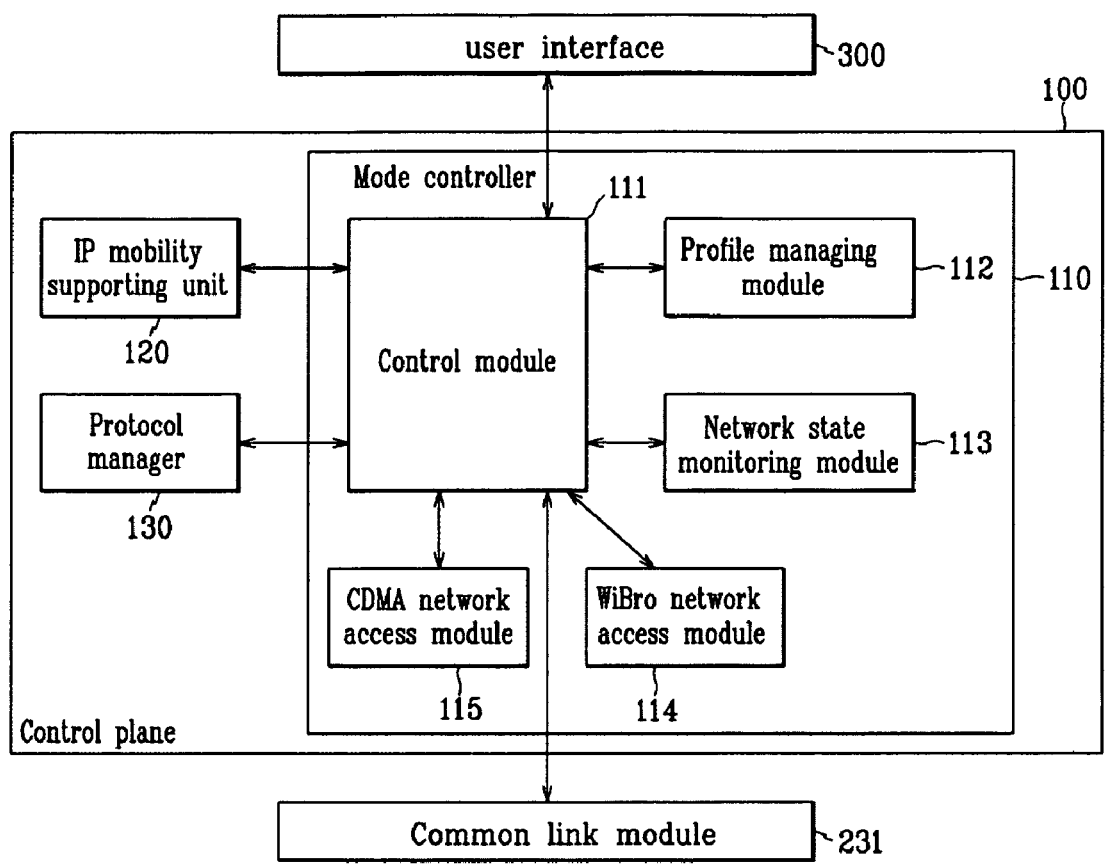
FIG. 3 shows a diagram for representing a mode controller according to the exemplary embodiment of the present invention.

FIG. 3 shows a diagram for representing the mode controller according to the exemplary embodiment of the present invention. As shown in FIG. 3, the mode controller 110 according to the exemplary embodiment of the present invention includes a control module 111, a profile managing module 112, a network state monitoring module 113, a WiBro network access module 114, and a CDMA network access module 115.

The platform according to the exemplary embodiment of the present invention supports an automatic handoff function for automatically switching an accessed network according to the analysis of the network states, and a manual handoff function for switching the accessed network according to the user's request.

The control module 111 includes a network selection algorithm for selecting a network for performing an optimum data communication service according to signal characteristics of an area where the communication terminal supporting the platform according to the exemplary embodiment of the present invention is located, and selects a network by periodically performing the network selection algorithm when the automatic handoff is predetermined. At this time, the network selection algorithm in the control module 111 compares the received signal strength at the CDMA device driver 221 and the WiBro device driver 223 with information provided by the profile managing module 112, and may request the handoff so as to switch the network of the communication terminal when the received signal strength of the other network is greater than a predetermined received signal strength threshold value. In addition, the network selection algorithm in the control module 111 may automatically select an appropriate network according to the received signal strength threshold value in a case of an initial access of the terminal.

The control module 111 transmits a handoff request for switching from the currently accessed network to the network selected by the network selection algorithm to the common link module 231 of the data plane 200.

When the manual handoff is predetermined, the control module 111 receives requests for performing access and handoff to the selected network, the requests directly inputted from a user through a user interface 300 including a graphical user interface (GUI), processes the request, and transmits the handoff request for switching from the currently accessed network to the selected network to the common link module 231.

When the handoff to the newly selected network is performed, the control module 111 transmits a control signal to the IP mobility supporting unit 120, performs COA allocation, IP encapsulation, and IP tunneling operations, and provides seamless data communication. In addition, the control module 111 transmits handoff information to the protocol manager 130, controls the protocol manager 130 to update parameters of protocols of the fourth layer 240 of the data plane 200 in real time.

The profile managing module 112 stores information inputted through the user interface 300. The user interface 300 may display signal reception state information of the respective networks on a screen, a user establishes a network to access by using the displayed information, and the information is transmitted through the control module 111 and stored in the control module 111. In addition, the profile managing module 112 stores automatic or manual handoff selection information and user preferred network information inputted through the user interface 300, so that the control module 111 may select a network by using the information.

The network state monitoring module 113 reads information of variation of the received signal strength measured by the CDMA device driver 221 or the WiBro device driver 223, and provides the information to the control module 111 so that the control module 111 may use the information to select a network.

While the profile managing module 112 and the network state monitoring module 113 operate as elements separated from the control module 111 in the exemplary embodiment of the present invention, they may be included in the control module 111 rather than being separated into the respective blocks.

The WiBro network access module 114 initializes the WiBro device driver 223 to receive the data packet transmitted by the common link module 231 when the control module 111 transmits the handoff request for switching the network to the WiBro network to the common link module 231, and stops the operation of the WiBro device driver 223 when the handoff request for switching the network to the CDMA network is received. In addition, the WiBro network access module 114 performs a ranging process for correcting information on timing, power, and frequency between the terminal and the base station. The WiBro network access module 114 initially performs an initial ranging process, and then periodically performs a periodic ranging process. In addition, the WiBro network access module 114 performs an authentication process for providing a data service to the terminal by using a device identifier such as an MAC address and a certificate of authentication.

The CDMA network access module 115 initializes the CDMA device driver 221, and performs CDMA access network access and authentication processes in a like manner of the WiBro network access module 114.

Figure 4:
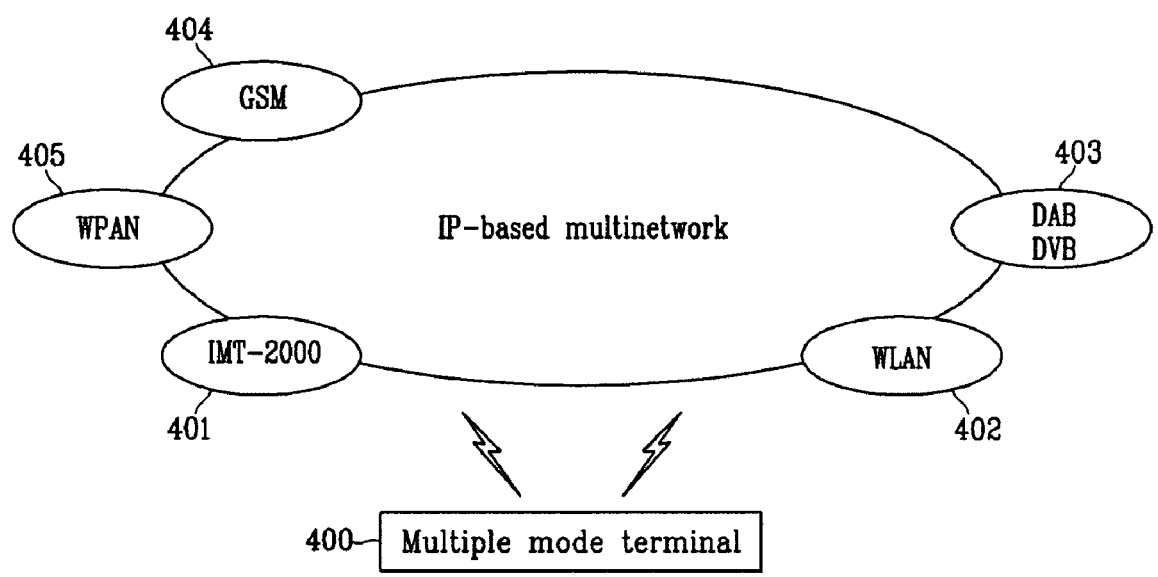
FIG. 4 shows a diagram for representing a communication environment to which the multiple mode terminal according to the exemplary embodiment of the present invention is accessed.

FIG. 4 shows a diagram for representing a communication environment to which the multiple mode terminal 400 according to the exemplary embodiment of the present invention is accessed. As shown in FIG. 4, due to the network selection and mobile IP support in the control plane 100 and the handoff of the common link module 231 in the data plane 200, the multiple mode terminal 400 according to the exemplary embodiment of the present invention may perform stable data communication in the IP-based multi-network system including an IMT-2000 401, a WLAN 402, digital video broadcasting (DVB) 403, a global system for mobile communication (GSM) 404, and a wireless personal area network (WPAN) 405.

In the above communication environments, the multiple mode terminal 400 having a hardware or a software configuration of the interface and protocol for accessing various wireless systems may provide various application services including M-commerce, a location-based service (LBS), a multimedia service, a voice service, a multimedia message service, and a mobile Internet service.

Figure 5:
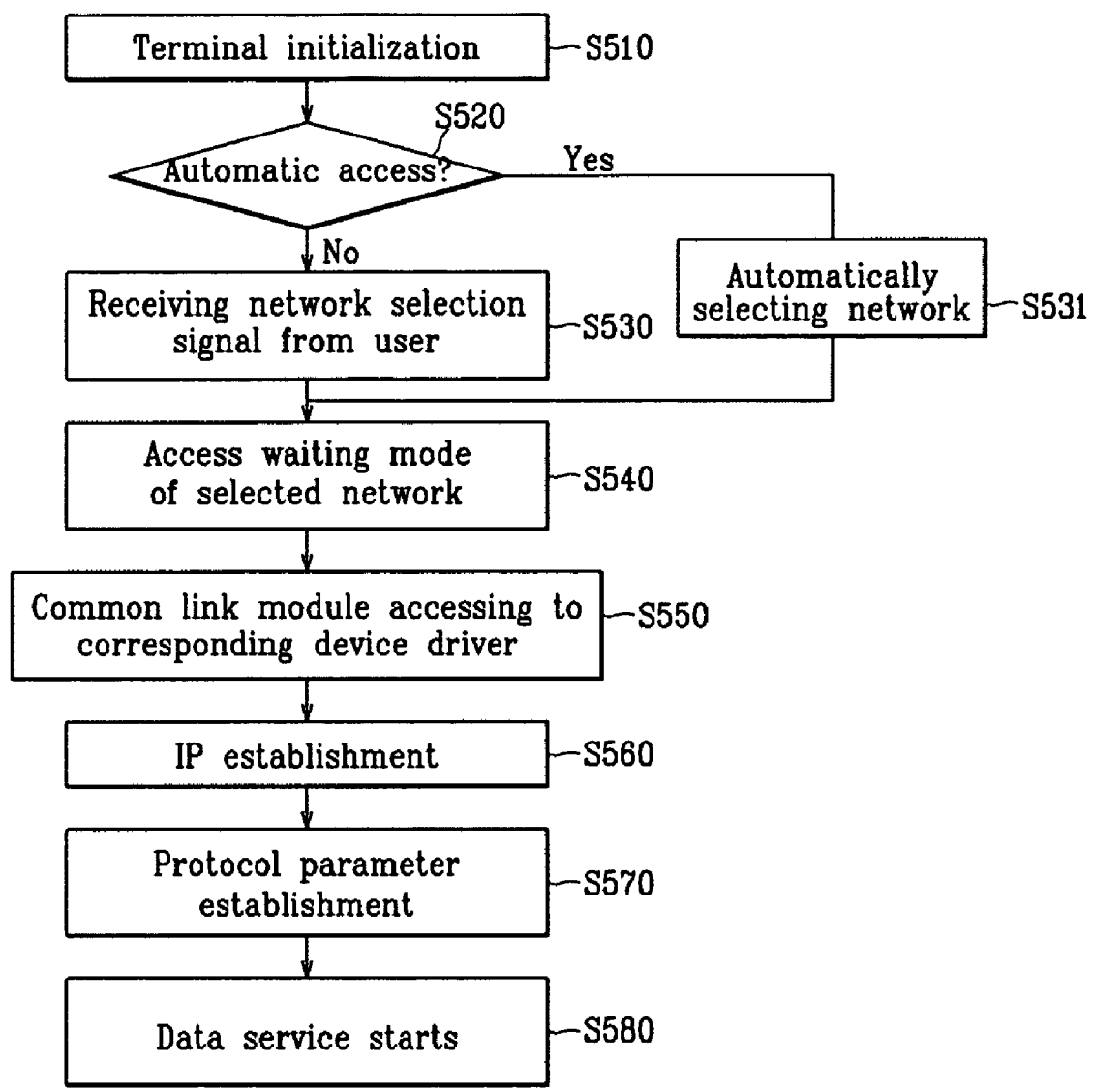
FIG. 5 shows a flowchart for representing an initial network access process of the multiple mode terminal according to the exemplary embodiment of the present invention.

FIG. 5 shows a flowchart for representing an initial network access process of the multiple mode terminal according to the exemplary embodiment of the present invention.

When a power source is applied to the communication terminal, terminal initial setting and communication protocol parameter initialization are performed, and a transmission signal is received in the network including the terminal in step S510.

When the terminal is initialized, the mode controller 110 determines whether a user set the mode to automatic network selection with reference to the profile managing module 112 in step S520. When the automatic access is set, the network selection algorithm is executed based on information of the profile managing module 112 and the network state monitoring module 113, and a network is selected to perform the optimum data service in step S531. Otherwise, when the manual access is set in step S520, the mode controller 110 provides a screen for selecting a network by controlling the user interface 300, and receives a network selection signal from the user in step S530.

The network is selected in the above process, the mode controller 110 transmits a network selection result to the IP mobility supporting unit 120 and protocol manager 130, and transmits a handoff request to the common link module 231 so that the terminal remains in an access waiting mode in step S540.

The common link module 231 receiving the handoff request from the mode controller 110 accesses a device driver of the selected network, and establishes a data communication path in step S550.

The IP mobility supporting unit 120 allocates the COA, and performs IP connection setting for the terminal in step S560.

The protocol manager 130 appropriately changes the protocol parameters according to characteristics of a corresponding network in step S570 so that the terminal may function for a corresponding network and may remain in the optimum data communication state.

In the above process, a data transmission path through a device driver for the communication is established, a terminal that received an IP address establishes a connection for the data transmission, and the data service is started in step S580.

Figure 6:
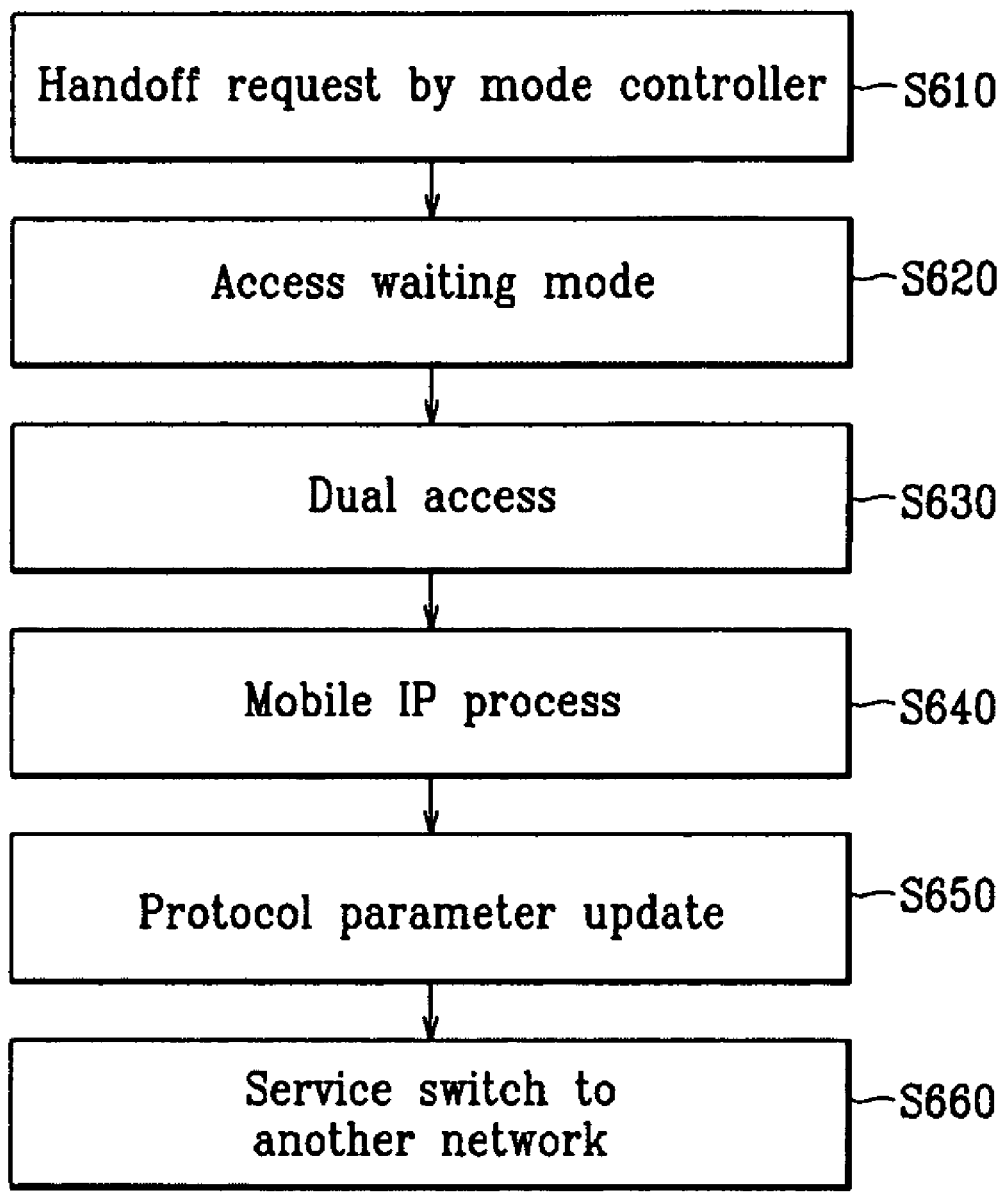
FIG. 6 shows a flowchart for representing a handoff process of the multiple mode terminal according to the exemplary embodiment of the present invention.

FIG. 6 shows a flowchart for representing a handoff process of the multiple mode terminal according to the exemplary embodiment of the present invention.

When it is determined that the network is set to be automatically selected with reference to the profile managing module 112, the mode controller 110 executes the network selection algorithm using the received signal strength at the CDMA device driver 221 and the WiBro device driver 223, the received signal strength having been received by the network state monitoring module 113. When it is determined that the received signal strength of the other network is greater than the received signal strength threshold value for the predetermined handoff, the handoff request is transmitted to the common link module 231 in step S610. In addition, when the handoff is set to be manually performed, the mode controller 110 receives the handoff request through the user interface 300, and transmits the handoff request to the common link module 231 in step S610.

The mode controller 110 transmits the network selection result to the IP mobility supporting unit 120 and the protocol manager 130 so that the terminal remains in the access waiting mode in step S620.

The common link module 231 temporarily establishes the data transmission path to both the CDMA device driver 221 and the WiBro device driver 223, and maintains a dual access in step S630 to minimize service interruption before the handoff is finished.

While maintaining the dual access, the IP mobility supporting unit 120 allocates the COA and establishes an IP connection for the terminal in step S640.

The protocol manager 130 establishes the protocol parameter in step S650 according to characteristics of a corresponding network so that the terminal may function for the predetermined network and maintain the optimum data communication state.

Accordingly, the data transmission path through a device driver of a switched network is established, and a terminal in which the IP connection establishment is finished by using the COA establishes data transmission connection, starts the data service in a communication method of the switched network, and ends the handoff process in step S660.

While the handoff between the CDMA and WiBro networks has been described in the exemplary embodiment of the present invention, handoff between various communication systems may be performed by providing the platform with device drivers and hardware interfaces that support respective network services without changing the configuration of the higher layer of the common link module 231.

In addition, while the handoff between the heterogeneous networks (i.e., vertical handover) has been described in the exemplary embodiment of the present invention, the IP-based data communication service may be provided through a control process of the control module 111 and the protocol manager 130 when a horizontal handover according to a received signal strength variation caused by a communication terminal location variation is performed.

According to the exemplary embodiment of the present invention, mobility in the IP-based communication environment may be guaranteed since the common link module controls the transmission path of the data packet without changing the higher layer.

In addition, since the accesses to heterogeneous networks are temporarily maintained, communication service interruption may be minimized, and the automatic handoff according to the network state variation and the manual handoff according to the user's selection may be supported.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A multiple mode terminal supporting handoff between heterogeneous networks, the multiple mode terminal comprising:

a mode controller for using network state monitoring information and controlling the handoff between a plurality of networks;

an application service unit comprising protocols providing appropriate data communication services for the plurality of networks, and a plurality of programs designed to perform data communication services;

a plurality of device drivers controlling the multiple mode terminal to perform a function for the data service in the plurality of networks;

a common link module for performing the handoff between the heterogeneous networks by a handoff request of the mode controller, updating a transmission path of the data packet which is connected with one of the plurality of the device drivers according to the performed handoff, and supporting a data communication service of the application service unit through the transmission path;

a control module for selecting a network providing an optimum communication service to the multiple mode terminal from among a plurality of accessible networks based on the network state monitoring information, and transmitting the handoff request to the common link module; and a plurality of network access modules for controlling operations of the plurality of device drivers and performing authentication of the multiple mode terminal in order to perform the handoff to a network selected by the control module.

2. The multiple mode terminal of claim 1, wherein the network state monitoring information comprises at least one among a received signal strength, a data rate, and a data transmission error rate of the respective networks.

3. The multiple mode terminal of claim 2, wherein the common link module is formed in a different layer from those of the plurality of device drivers and the application service unit, and is formed in an higher layer of the layer of device drivers.

4. The multiple mode terminal of claim 3, wherein the common link module transmits an MAC address of an accessed device driver among the plurality of device drivers to the higher layer.

5. The multiple mode terminal of claim 4, wherein the plurality of device drivers periodically determine the received signal strength, data rate, and data transmission error rate of a corresponding network.

6. The multiple mode terminal of claim 5, wherein:

an IP mobility supporting unit receives the handoff request from the mode controller, and supports a mobile IP; and a protocol manager for changing the protocol parameter of the application service unit according to a communication state variation caused by the handoff.

7. The multiple mode terminal of claim 1, wherein the IP mobility supporting unit receives information on the network selected by the mode controller, and allocates a care of address (COA).

8. The multiple mode terminal of claim 7, wherein the mode controller, the IP mobility supporting unit, and the protocol manager are formed in one layer, and the application service unit, the common link module, and the plurality of device drivers are formed in respective layers.

9. The multiple mode terminal of claim 1, wherein the plurality of networks comprises a code-division multiple access (CDMA) network and a wireless broadband Internet (WiBro) network.

10. A handoff method of a multiple mode terminal having a platform supporting handoff between a plurality of networks, the multiple mode terminal for providing seamless data communication, the handoff method comprising:

the multi-mode terminal determining whether an automatic network access mode is set up;

the multi-mode terminal selecting an optimum network based on received signal strength information when the automatic network access mode is set up;

the multi-mode terminal establishing a transmission path of a data packet for the optimum network;

the multi-mode terminal maintaining access to a device driver of a previously accessed network and a device driver of the optimum network before a care of address allocation and a protocol parameter update are finished;

the multi-mode terminal allocating a mobile Internet protocol (IP), changing a protocol parameter according to a corresponding network, and performing data transmission;

selecting a network providing an optimum communication service to the multiple mode terminal from among a plurality of accessible networks based on a network state monitoring information, and transmitting a handoff request to a common link module; and controlling operations of a plurality of device drivers and performing authentication of the multiple mode terminal in order to perform a handoff to the selected network.

11. The handoff method of claim 10, further comprising maintaining access of a previously accessed network and a network to be accessed before the mobile IP allocation and the protocol parameter change is finished.

12. A computer readable recording medium on which a program is recorded to perform the method of claim 10.

* * * * *